May 14, 1968 R. E. WEISS 3,383,604
DOUBLE THRESHOLD DETECTION SYSTEM
Filed May 9, 1966 2 Sheets-Sheet 1

RICHARD E. WEISS
INVENTOR.

BY
ATTORNEYS

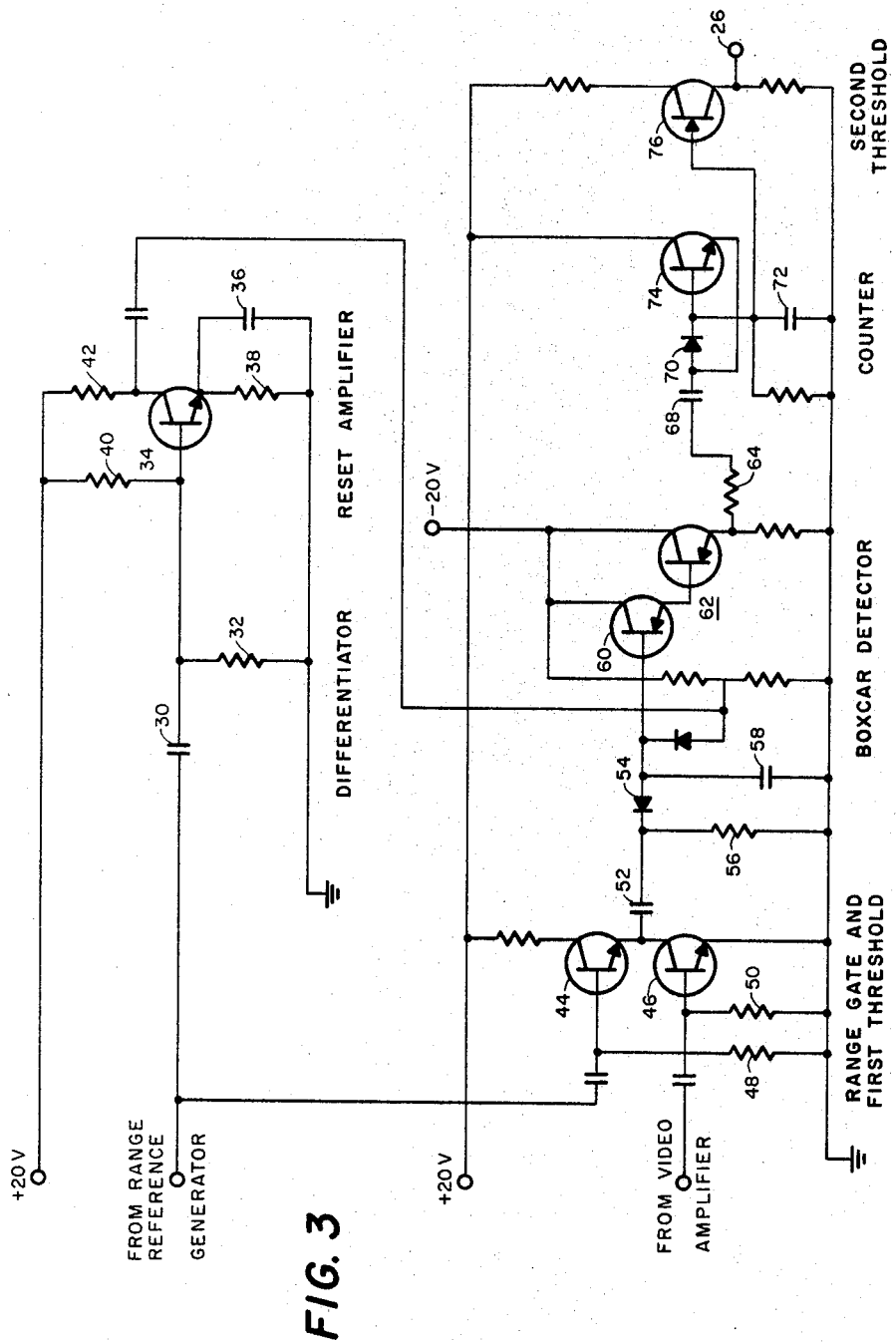

United States Patent Office 3,383,604
Patented May 14, 1968

3,383,604
DOUBLE THRESHOLD DETECTION SYSTEM
Richard E. Weiss, Corona, Calif., assignor to the United States of America as represented by the Secretary of the Navy
Filed May 9, 1966, Ser. No. 548,537
4 Claims. (Cl. 328—134)

The invention herein described may be manufactured and used by or for the Government of the United States of America for governmental purposes without the payment of any royalties thereon or therefor.

The present invention relates to double threshold detection systems and more particularly to double threshold detection systems employing self-adjusting integration time.

In active target detecting devices which employ short-pulse radar techniques in order to detect targets anywhere within the kill radius of the warhead of the missile, range gates are employed to determine if the return pulse has the proper delay as compared to the time the pulse was transmitted to assure that the target is within range of the warhead of the missile. The returned pulse energy is proportional to the inverse fourth power of the range between the target and the target detecting device; therefore, the signal-to-noise ratio out of the target detecting device amplification system is proportional to the inverse fourth power of range.

In prior known target detecting device systems utilizing the integration time for a given expected signal-to-noise ratio (commensurate to range) the practice has been to employ many parallel double threshold channels, each channel optimized for a particular range. Since a target detecting device does not require accurate range information, but must decide if a target is within the kill radius of the warhead there is much added circuitry required with the prior known systems just to assure the detection time is being met.

The present invention provides a detection system which will determine if the target is within the kill radius of the warhead as the prior known systems but with much simplified circuitry that utilizes one double threshold channel that is simpler in construction and operates more efficiently. The present invention provides a double threshold detection system which includes a self-adjusting integration time that is tailored to the range between the target detecting device and a target. One input to the signal processing section of the detection device is a train of range reference pulses, each having a width from time of transmit to a time equal to twice the reciprocal of the speed of light, $2/c$, multiplied by the maximum range at which the target is expected to be detected. This reference pulse is differentiated and amplified to generate a pulse (designated the reset pulse) with a time delay equal to $2/c$ multiplied by the maximum warhead range. A second input pulse is fed from the video amplifier and if this input pulse exceeds a predetermined given voltage threshold and is in time coincidence with the reference pulse, a pulse of fixed amplitude is stored in a boxcar circuit until reset by the reset pulse. This produces a pulse of width equal to the $2/c$ multiplied by the maximum range minus the predetermined time multiplied by the range $$\tau_D = 2\left(\frac{Rm-R}{c}\right)$$

which is fed to a counter circuit which responds in a manner that the amplitude of each count step is proportional to its input pulse width. Once the counter counts up to a second voltage threshold, a target indication is produced. Since the integration time of the double threshold detection system is proportional to the number of count steps required to reach the second threshold, the integration time is proportional to the actual range between the target detecting device and the target. Accordingly, an object of the present invention is the provision of a double threshold detection system employing self-adjusting integration time for use in an active target detecting device which employs short-pulse radar techniques.

Another object of the invention is to provide a double threshold detection system which overcomes the deficiencies of prior known systems of this type.

Other objects and many of the attendant advantages of this invention will become readily appreciated as the same becomes better understood by reference to the following detailed description when considered in connection with the accompanying drawings wherein:

FIG. 3 is a schematic diagram of the embodiment of FIG. 1.

Figure 1:
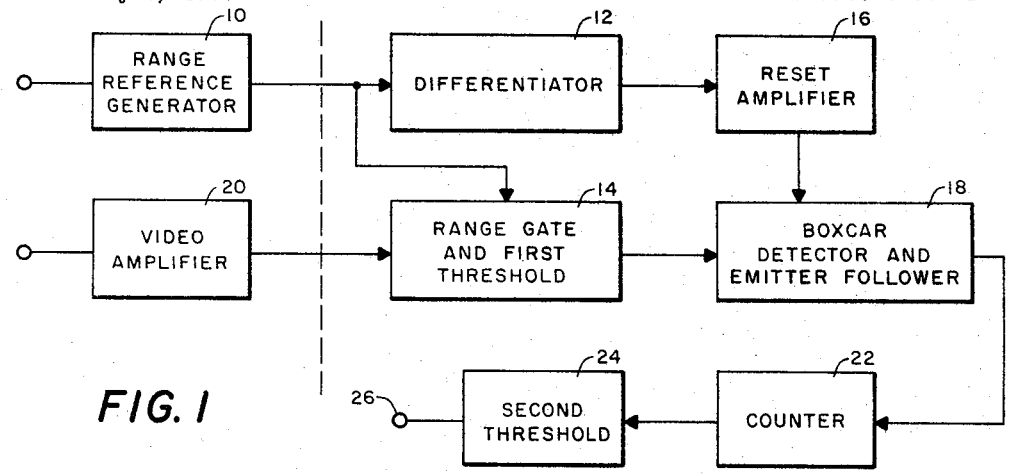
FIG. 1 is a block diagram of a preferred embodiment of the invention.

Referring now to the drawings there is shown in FIG. 1 a range reference generator 10 which may be for generating reference pulses, each having a width from time-zero to, .002 μs. multiplied by Rm (Rm being the maximum range at which the target is expected to be detected). The output reference pulse from range reference generator 10 is fed to differentiator circuit 12 and range gate and first threshold circuit 14. The differentiated reference pulse is fed to reset amplifier 16 where it is amplified to produce a pulse (designated the reset-pulse) with a time delay equal to .002 μs. multiplied by the expected maximum range, Rm. The output pulse from reset amplifier 16 is fed to boxcar detector and emitter follower circuit 18. A target signal from the video amplifier of the target detecting device (only that portion of a target detecting device to which the invention is directed is shown) is fed as a second input to range gate and first threshold circuit 14. When the amplitude of the pulse from video amplifier 20 exceeds a predetermined voltage threshold and is in time coincidence with the reference pulse from range reference generator 10 a pulse of fixed amplitude is fed to boxcar detector and emitter follower 18 where it is stored until a reset pulse is received from reset amplifier 16. The output pulses from boxcar detector and emitter follower 18 are fed to counter 22 where the pulses are counted until a second threshold voltage is obtained. The output of counter 22 is fed to the second threshold circuit 24 which produces an output pulse in response to the output from counter 22 to indicate the presence of a target signal.

As shown in FIG. 3, differentiator 12 is a simple RC high-pass filter consisting of capacitor 30 and resistor 32. Reset amplifier 16 is a standard transistor amplifier circuit consisting of transistor 34 emitter biasing capacitor 36 and biasing resistor 38, base bias resistor 40 and collector bias resistor 42. Range gate and first threshold circuit 14 consist of two transistors 44 and 46 connected as an "and" gate. The threshold level of the gate is set by the choice of the value of bias resistors 48 and 50. The output signal from the range gate and first threshold circuit 14 is coupled through coupling capacitor 52 to a diode 54 and resistor 56 network and storage capacitor 58 of boxcar detector and emitter follower 18. The signal stored across capacitor 58 is also applied to the base of transistor 60 which is the input of the Darlington emitter follower circuit 62. The output of emitter follower circuit 62 is coupled through resistor 64 and coupling capacitor 68 and through rectifier 70 to capacitor 72 of counter 22.

The voltage across capacitor 72 is coupled to the base of transistor 74 and when the voltage stored on capacitor 72 reaches an amplitude sufficient to trigger transistor 74, an increasingly stepped output is applied to the base of transistor 76 of the second threshold circuit 24. When the output from counter 22 reaches a predetermined voltage, the second threshold circuit 24 conducts and produces an output pulse at terminal 26 indicating that a target signal is present. Counter 22 comprises a storage capacitor 72 preceded by a diode 70. Transistor 74 is to provide a closed loop to assure stability and counting linearity. The required storage time is in the order of one pulse repetition period so that counter 22 must also be followed by a high input impedance device which is a second threshold circuit 24 and includes a unijunction transistor or field effect transistor 76 which has the required high input impedance. Transistor 76 should produce an output pulse when the output voltage from counter 22 reaches a voltage equal to approximately 60% of the circuit supply voltage.

Figure 2:
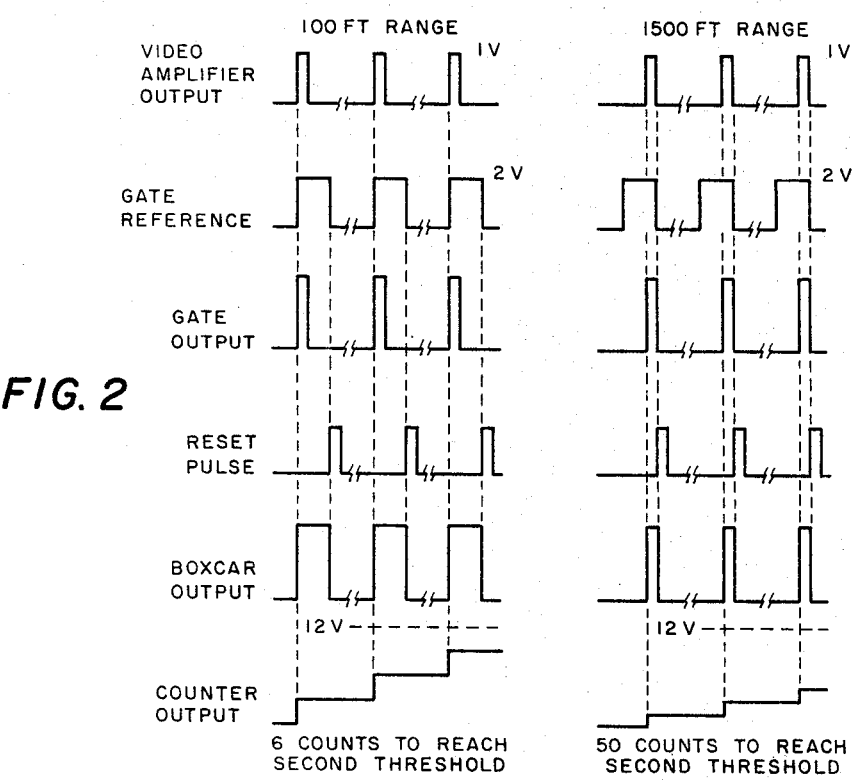
FIG. 2 is a graph of illustrative waveforms by way of example used in explaining the operation of the invention.

In operation as shown in FIG. 2, the relative time at which the video amplifier output signal appears depends upon the distance of the detecting device from the target. Referring to the waveforms of FIG. 2, the waveforms associated with the 100 feet range show the video amplifier output signal appearing much sooner than in the 1500 feet range waveforms. The output signals from range reference generator are all uniform and equally spaced. The output signals from range gate 14 coincide with the video amplifier signals and therefore appear in the same relative position as the video amplifier output signals but they must occur within the reference gate. The reset pulses appear at the trailing edge of the differentiated range reference pulses. The boxcar output does not start until an output pulse from the range gate and first threshold circuit 14 appears and is terminated by the reset pulse which is received from reset amplifier 16. The boxcar output is of a much longer duration for the 100 feet range example than for the 1500 feet range example. Fewer of the wide output pulses are required to charge storage capacitor 72 of the counter circuit 22 to the threshold voltage than the shorter output pulses which are the result of a long range between target and target detecting device.

Obviously many modifications and variations of the present invention are possible in the light of the above teachings. It is therefore to be understood that within the scope of the appended claims the invention may be practiced otherwise than as specifically described.

What is claimed is:

1. In a double threshold target signal detection system, the combination comprising:

(a) a source of equally spaced reference pulses,
(b) a source of time-delayed pulses of the same repetition rate as said reference pulses,
(c) a gate circuit having a first input coupled to said source of reference pulses and a second input coupled to said source of time-delayed pulses for producing an output pulse when said time-delayed pulse occurs during the duration of one of said reference pulses.
(d) detector circuit means coupled to said gate circuit means for storing pulses received from said gate circuit means,
(e) control circuit means coupled between said source of reference pulses and said detector circuit means for discharging the stored signal in said detector circuit means and thereby controlling the pulse width of each detector output pulse,
(f) counter circuit means coupled to said detector circuit means and being responsive to produce an output pulse whose amplitude is proportional to the width and number of the input pulses,
(g) threshold circuit means coupled to said counter circuit means for producing firing pulse in response to a predetermined amplitude of the output of said counter circuit means.

2. The double threshold target signal detection system of claim 1 wherein said gate circuit comprises a first transistor having said source of equally spaced reference pulses coupled to its base and a second transistor having said source of time-delayed pulses coupled to its base and its collector connected to the emitter of said first transistor.

3. The detection system of claim 1 wherein said detector circuit means is a boxcar detector and produces output pulses whose widths are proportional to the range of the target.

4. The double threshold target signal detection system of claim 1 wherein said control circuit means comprises a differentiating network coupled to said source of equally spaced reference pulses for producing a reset pulse from the trailing edge of said reference pulses and an amplifier for amplifying and coupling the reset pulses to the detector circuit.

References Cited

UNITED STATES PATENTS

| | | | |
|---|---|---|---|
| 3,020,483 | 2/1962 | Losee | 328—110 |
| 3,227,952 | 1/1966 | Proebster et al. | 328—134 X |
| 3,334,303 | 8/1967 | Shepherd | 328—110 |

JOHN S. HEYMAN, *Primary Examiner.*